A. DE CONINCK.
CRANK SHAFT.
APPLICATION FILED JUNE 11, 1912.
1,077,511.
Patented Nov. 4, 1913.
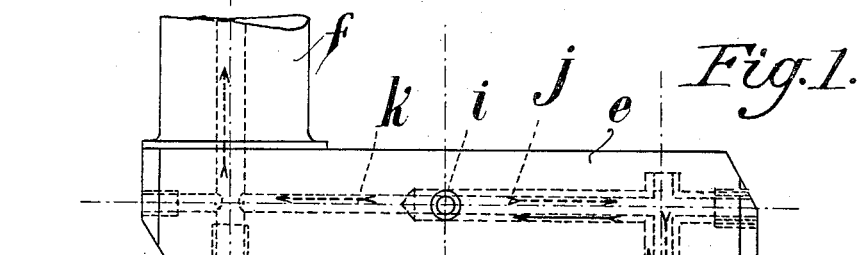
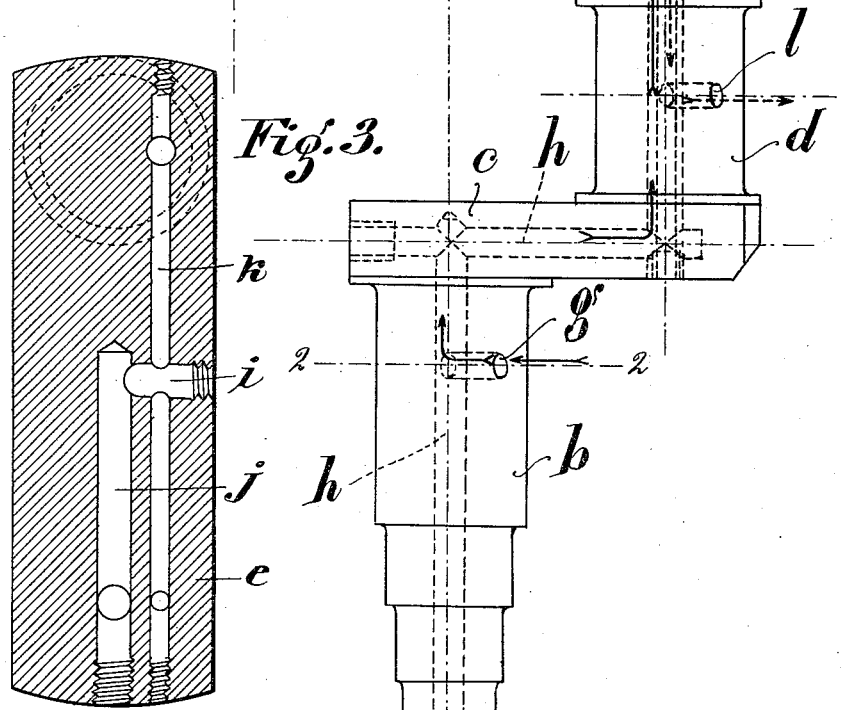
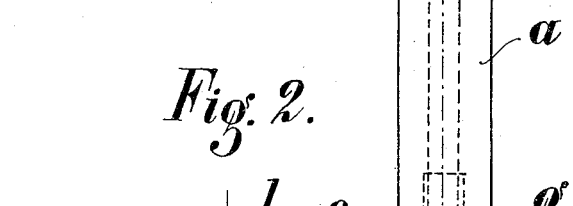

UNITED STATES PATENT OFFICE.

ARTHUR DE CONINCK, OF WOLUWE-ST.-LAMBERT, NEAR BRUSSELS, BELGIUM.

CRANK-SHAFT.

1,077,511.  Specification of Letters Patent.  Patented Nov. 4, 1913.

Application filed June 11, 1912. Serial No. 703,068.

*To all whom it may concern:*

Be it known that I, ARTHUR DE CONINCK, a subject of the King of Belgium, residing at Woluwe-St.-Lambert, near Brussels, in the Kingdom of Belgium, have invented certain new and useful Improvements in Crank-Shafts.

In engines with four cylinders without a central bearing, hitherto it has been particularly difficult, if not impossible, to lubricate the two central crank pins by oil circulation. The action of centrifugal force prevented the oil from reaching these crank pins through the conduit of the crank shaft.

This invention relates to a conduit arrangement which obviates the drawback in question and enables the centrifugal force to be utilized for facilitating and even bringing about the circulation toward the central crank pins.

The accompanying drawing shows, by way of example, a construction of the arrangement in question.

Figure 1 is a partial longitudinal elevation of a crank shaft with four crank pins, but two of the pins being shown and the shaft being without a central bearing. Fig. 2 is an end view thereof partly in section. Fig. 3 is a section on the line 3—3 of Fig. 1.

In the drawing, $a$ is one of the ends of the shaft, $b$ one of the end journals, $c$ one of the end cranks, $d$ one of the end crank pins, $e$ one of the double central cranks and $f$ one of the central crank pins.

The oil supplied under pressure to the end bearing, passes through the opening $g$ of the bearing $b$ into the main conduit $h$ and follows the path indicated by the full arrow up to $i$, that is to say, up to the center of the crank $e$, where the main conduit $h$ branches off into two conduits $j$ $k$ arranged in line with each other each going toward one end of the crank $e$ in order to supply respectively the end crank pin $d$ through an opening $l$, and the central adjoining crank pin $f$ through a similar orifice (not shown).

It will be understood that the oil supplied to the point $i$, in the center of the double crank, is forced, in two opposite currents of equal size, by the action of centrifugal force, toward the two opposite crank pins $d$ and $f$ which are then lubricated identically to the same extent.

The same arrangement of conduits is provided at the other end of the crank shaft for lubricating the corresponding end crank pin and central crank pin.

It will be seen at once that with a single continuous conduit for supplying the two crank pins $d$ $f$, there would be an excessive lubrication at the orifice $l$ for the crank pin $d$, but that in order to pass from the crank pin $d$ to the point $i$ and thence to the crank pin $f$, the oil would have to overcome the action of centrifugal force which is the greater, the longer the arm of the crank and the greater the speed of rotation. In these conditions, the lubrication of the central crank pins is possible (and then only with very bad distribution of oil) only by using excessive pressure of oil at the end bearings, so as to overcome the resistance of centrifugal force.

Perfectly tight closing of the end bearings which moreover cannot be obtained in practice, becomes an important condition and makes it impossible to obtain sufficient lubrication for the central crank pins.

Having now particularly described and ascertained the nature of my said invention, and in what manner the same is to be performed, I declare that what I claim is:

1. In a crank shaft provided with a plurality of pins, said shaft being provided with conduits for equally lubricating adjacent pins comprising a conduit leading through said shaft from one end to a point intermediate a pair of adjacent pins, and branch conduits leading from the first conduit at said intermediate point and opening outward through respective pins.

2. In a crank shaft provided with a pair of pins connected by a double armed crank, said shaft being provided with conduits for equally lubricating said pins comprising a conduit leading through said shaft from one end thereof to a point in said double armed crank in the axis of said shaft, and branch conduits leading through said crank shaft from said first mentioned conduit and opening outward through said pins, said branch conduits communicating with the first conduit at said axial point.

In testimony whereof I affix my signature in presence of two witnesses.

ARTHUR DE CONINCK.

Witnesses:
L. PARETTE,
CHAS. ROY NASMITH.